United States Patent [19]

Francis, Jr.

[11] 4,049,286
[45] Sept. 20, 1977

[54] LATCH ASSEMBLY FOR CONTAINERIZED BAGGAGE TRAILER

[75] Inventor: George W. Francis, Jr., Saginaw, Mich.

[73] Assignee: Saginaw Products Corporation, Saginaw, Mich.

[21] Appl. No.: 648,586

[22] Filed: Jan. 12, 1976

[51] Int. Cl.² ............................................. B60P 7/00
[52] U.S. Cl. ............................ 280/179 R; 105/366 B; 248/500
[58] Field of Search ................ 280/179 R; 105/366 B, 105/366 C, 366 E, 463, 464, 465, 287; 248/500, 503; 298/17.7, 17.6, 17.5; 296/35 A

[56] References Cited

U.S. PATENT DOCUMENTS

| | | | |
|---|---|---|---|
| 821,528 | 5/1906 | Otis | 105/287 |
| 2,029,995 | 2/1936 | Flowers | 298/17.7 |
| 2,496,916 | 2/1950 | Kershaw | 280/179 R X |
| 2,623,759 | 12/1952 | Forbas | 280/179 R |
| 3,326,605 | 6/1967 | Steingas | 298/17.7 |
| 3,689,106 | 9/1972 | Young | 280/179 R |
| 3,868,083 | 2/1975 | Titcombe | 105/366 B |
| 3,933,101 | 1/1976 | Blas | 105/366 B |

Primary Examiner—Joseph F. Peters, Jr.
Assistant Examiner—Michael J. Forman
Attorney, Agent, or Firm—Learman & McCulloch

[57] ABSTRACT

A latch assembly for laterally and vertically restraining an aircraft baggage container in position upon the supporting platform of a baggage trailer. Separate latch members are provided for respectively restraining the baggage container against lateral and vertical movement upon the supporting platform. A common actuating member is employed to sequentially release the vertical and lateral restraints so that the vertical restraint may be released (to permit opening of the container doors) without releasing the lateral restraint so that baggage may be placed in or removed from a container located upon a trailer while the container is latched against lateral movement upon the trailer platform.

9 Claims, 6 Drawing Figures

LATCH ASSEMBLY FOR CONTAINERIZED BAGGAGE TRAILER

BACKGROUND OF THE INVENTION

The present invention is especially designed for use as a latch assembly to hold aircraft baggage containers in position upon the baggage trailers employed to transfer the containers between the aircraft and the baggage handling rooms of an aircraft terminal. Baggage containers of the type with which the present invention are concerned are employed in the so-called wide bodied or jumbo commercial aircarft and because of their relatively large height to width ratio must be firmly latched in position upon the trailer platform to prevent sliding or tipping of the containers as the trailer train is towed to and from the aircraft. Typical latch assemblies employed for this purpose are shown in U.S. Pat. Nos. 3,689,106 and 3,868,083.

In order to perform its function, a latch employed in this environment must be capable of restraining the baggage container not only against horizontal sliding movement on the trailer platform, but must also restrain the container against vertical movement because the containers are susceptible to tilting as the baggage train is towed around corners. The containers are normally constructed with a horizontal flange which projects outwardly from the side of the container at the container bottom and in the usual case, the restraining latch is provided with a hook-shaped toe which is moved into overlying relationship with the container flange to provide the vertical restraint. It is frequently necessary to load or remove baggage from a container when the container is mounted upon the trailer. The container access door is constructed in a manner such that the lower surface of the door is flush with the top of the horizontal flange at the bottom of the container, and thus when the container latch is engaged, the toe portion of the latch which overlies the container flange prevents the container door from being opened. With latch assemblies such as those of U.S. Pat. Nos. 3,689,106 and 3,868,083, it is thus necessary to disengage the latch before the container door can be opened. Disengagement of the latch releases not only the vertical restraint upon the container, but also releases the lateral restraint so that the container is free to shift upon the platform while baggage is being loaded into it.

The present invention is especially directed to a latch arrangement in which the vertical restraint of the container may be released while lateral restraint of the container upon the trailer platform is maintained.

SUMMARY OF THE INVENTION

In accordance with the present invention, separate latching members are provided to perform vertical and lateral restraint functions. Lateral restraint of the container is accomplished by a set of latch members pivotally mounted upon the platform for movement about horizontal axes. The lateral restraint latches are normally biased, by a counterweight, to their operative position in which a toe portion of the latch projects vertically upwardly above the platform surface to engage a side surface of the container to restrain it against lateral movement. The lateral restraint latch member is retracted to an inoperative position below the platform surface by an actuating member which includes a rotatable shaft having a fixed radially projecting arm which is engageable with the lateral restraint to pivot it to its retracted position against the biasing action of the counterweight.

The vertical restraint includes a hook-like member which is mounted for free rotation on the actuating shaft between an upright position in which the hook-like member overlies a horizontal flange on the container to provide the vertical restraint, and a retracted position in which the hook-like member can swing freely down to a horizontal position below the platform surface. An abutment on the actuating shaft is engageable with the hook-like member to swing the hook-like member up into its operative position and to maintain it in this position until the actuating shaft is rotated in the opposite direction.

The lateral restraint operating arm and the vertical restraint operating abutment member on the actuating shaft are angularly offset from each other about the shaft so that the shaft can be rotated to fully release the hook-like vertical restraint member before the arm moves into operative latch releasing engagement with the lateral restraint member. The hook-like vertical restraint member is not positively moved to its retracted position, but is free to drop to this position upon the opening of a container door or alternatively upon movement of the container when the lateral restraint is released. In releasing the two restraints, the operator can tell when the lateral restraint is engaged because the biasing action of the counterweight on this latter restraint exerts sufficient force to be detected on the actuating shaft.

Other objects and features of the invention will become apparent by reference to the following specification and to the drawings.

IN THE DRAWINGS

Figure 1:
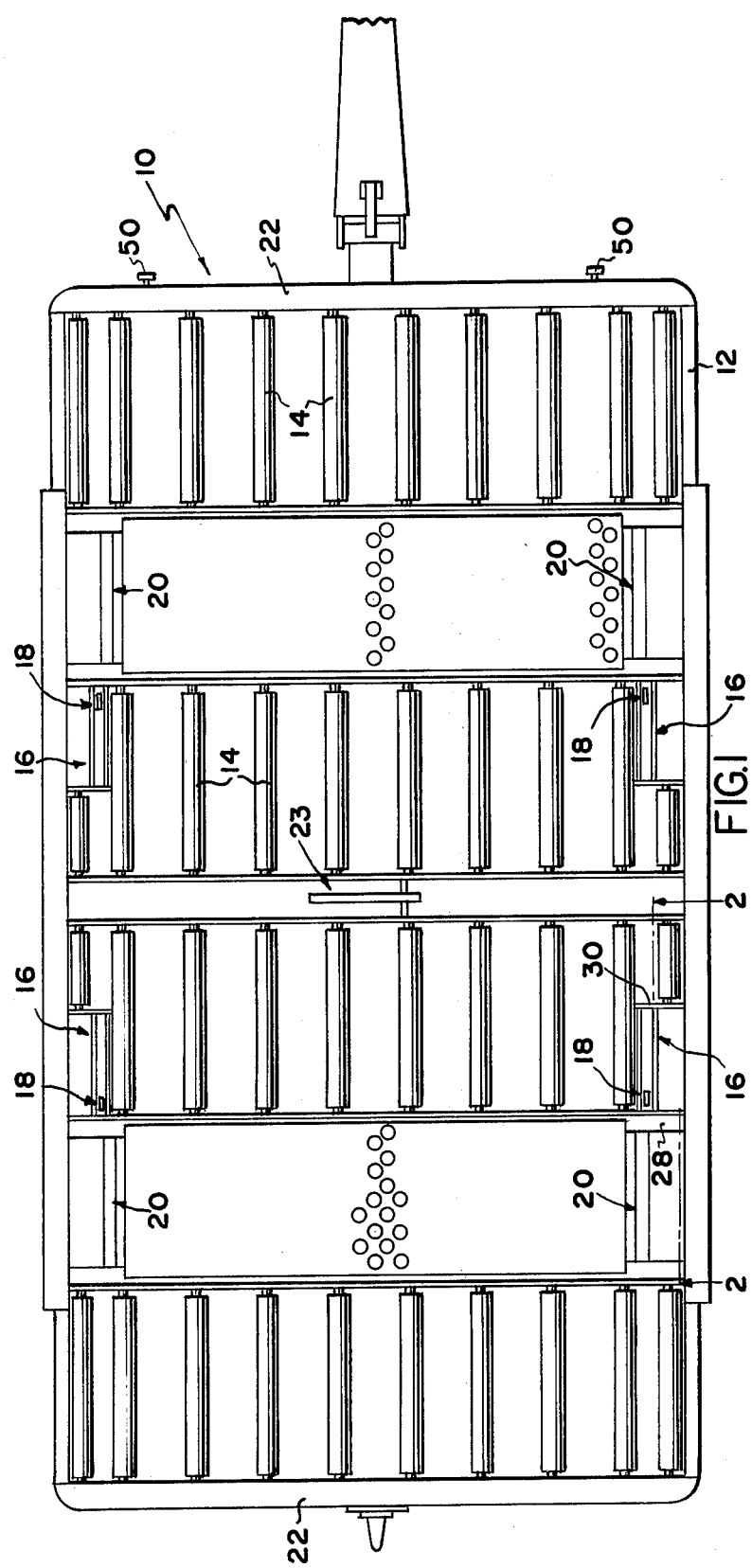
FIG. 1 is a top plan view of a baggage trailer embodying the present invention.

Referring first to FIG. 1, a baggage trailer employing the present invention includes a container supporting platform designated generally 10 which includes a rigid, generally rectangular frame assembly within which are supported a suitable number of freely rotatable support rollers 14, the rollers 14 defining the container supporting surface S of platform 10. The particular trailer shown is adapted to be loaded from the side, hence the axes of the support rollers 14 extend parallel to the fore and aft centerline of the trailer. Four latch assemblies designated generally 16 embodying the present invention are mounted upon platform 10 at the indicated location. Each latch assembly 16 includes a lateral restraint latch member designated generally 18 and a vertical restraint member designated generally 20. The lateral restraint latch members 16, as described in greater detail below, can be projected upwardly above the supporting surface defined by rollers 14 to prevent lateral shifting of a container supported on rollers 14 transversely of the platform. Lateral shifting of containers in a fore and aft direction upon the platform is prevented by a stationary frame member 22 at each end of the platform, the member 22 projecting upwardly above the surface of rollers 14 to present a permanent fixed abutment. The trailer shown in the drawings is adapted to handle one full size (LD11) container or either one or two half size (LD3) containers. When the half size containers are being handled a spring loaded center restraint 23 is automatically raised to be located between two half size containers or to confine a single half size container to the forward or aft half of the platform.

Details of the latch assemblies are best seen in FIGS. 2 through 6.

Figure 6:
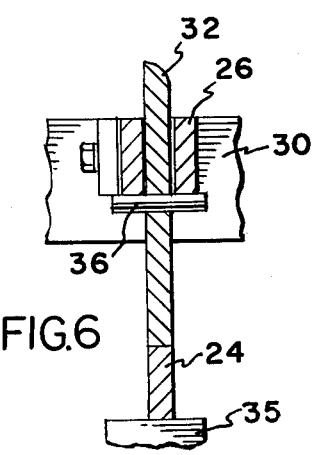
FIG. 6 is a detail cross-sectional view taken on the line 6—6 of FIG. 2.

Each of the lateral restraint latch members 16 includes a generally U-shaped first latch member 24. Latch member 24 is supported upon the fixed frame of platform 10 by an assembly which includes a pair of spaced parallel side plates 26 which are fixedly supported from fixed members of the platform frame such as 28 and 30. As best seen in FIG. 6, side plates 26 are spaced apart from each other by a distance only slightly exceeding the thickness of a toe portion 32 of first latch member 24. A pivot pin 34 co-operatively supported on side plates 26 is received in latch member 24 to provide the pivotal support of member 24 upon the platform. A counterweight 35 is mounted on latch member 24 at a location such that the counterweight gravitationally biases latch member 24 in a clockwise direction about pivot 34 as viewed in FIG. 2 so that toe portion 32 is continuously urged upwardly as viewed in FIG. 2.

A stop pin 36 is mounted in and projects outwardly from opposite sides of toe portion 32 and engages the under surfaces of side plates 26 to define a stop limiting clockwise pivotal movement of latch member 24 to a position in which the upper end of toe portion 32 projects upwardly above the supporting surface S (FIG. 2) defined by rollers 14. When latch member 24 is in its operative position shown in full line in FIG. 2, the upwardly projecting end portion of toe member 32 is engageable with a side surface of a baggage container C (FIG. 3) to define a stop restraining lateral movement of the container.

Figure 2:
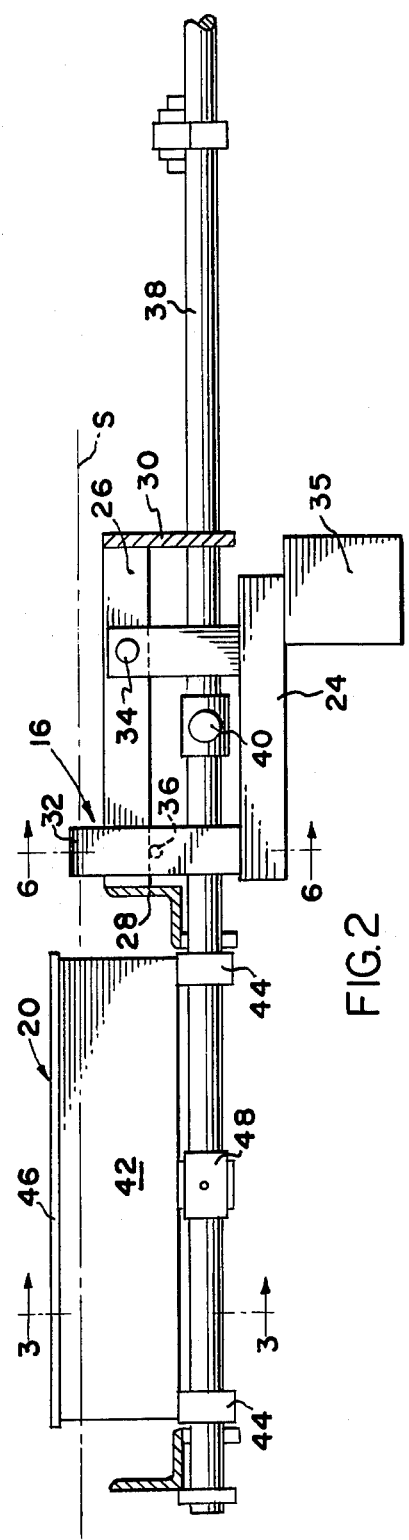
FIG. 2 is a detail cross-sectional view of the latch assembly taken on the line 2—2 of FIG. 1.

The lateral restraint latch member 24 is retracted from its operative position to a retracted position wherein the latch member is completely disposed below the surface S of the platform by means of an actuating mechanism which includes an elongate actuating shaft 38 mounted for rotation within the platform frame. A radially projecting arm 40 fixedly secured to shaft 38 is engageable, as indicated in FIG. 2, with latch member 24 so that if shaft 38 is rotated in a direction driving arm 40 downwardly as viewed in FIG. 2, latch member 24 is driven in counterclockwise pivotal movement about its pivotal mounting 34 until the upper end of toe portion 32 has been retracted below surface S.

Figure 5:
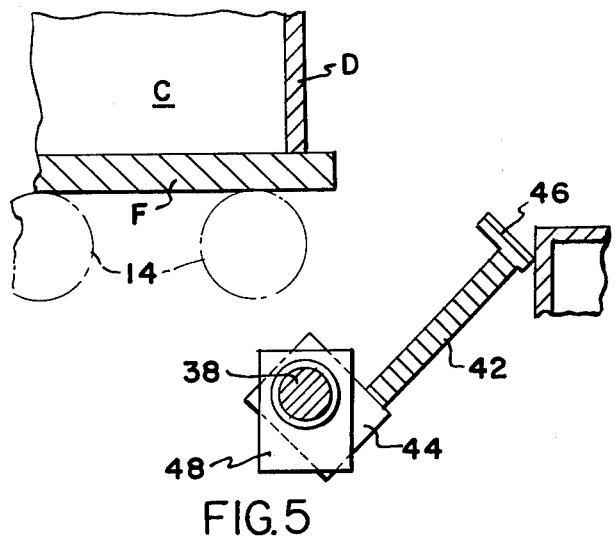

The vertical restraint assembly includes a plate-like restraining member 42 which is mounted for free pivotal movement upon shaft 38 by a pair of brackets 44 (see FIG. 5). Along the upper edge of the plate member 42, an inwardly projecting flange 46 is fixedly secured as by welding, the flange 46 being adapted to move into overlying relationship (FIG. 4) of the floor portion F of a baggage container C. An actuating block 48 (FIG. 5) is fixedly mounted upon shaft 38 and projects outwardly from the shaft to a position such that it can engage the under edge of plate member 42 to swing the plate member upwardly, upon counterclockwise rotation of shaft 38 from the FIG. 5 position into an operative position shown in FIG. 4.

Arm 40 and actuating block 48 are angularly aligned with respect to the axis of shaft 36 so that, when both the vertical and lateral restraint latches move from their respective retracted positions, the toe portion 32 of the lateral restraint arrives at its operative restraining position before the actuating block 48 engages the associated vertical restraint to start lifting the vertical restraint from its retracted position.

Figure 3:
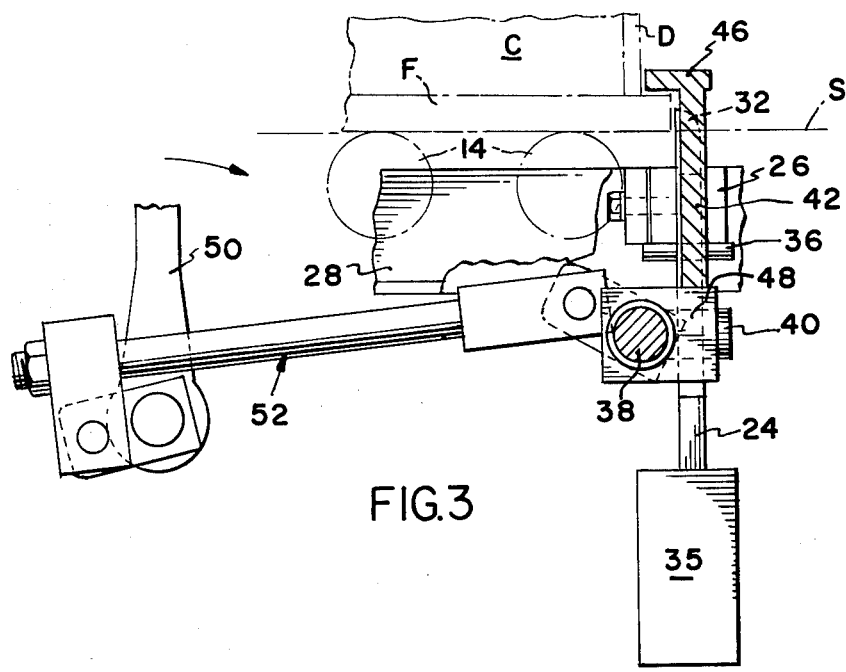
FIG. 3 is a detail cross-sectional view taken on line 3—3 of FIG. 2.
Figure 4:
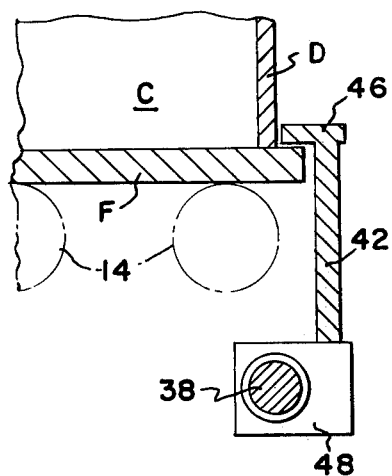
FIGS. 4 and 5 are detail cross-sectional views showing the vertical restraint engaged and disengaged respectively with a container.

Referring to FIG. 3, both lateral and vertical restraints are shown in their operative position with toe portion 32 projected upwardly above the surface S of the platform to engage a side surface of the container C and with flange 46 of the vertical restraint being operatively positioned in overlying relationship with the projecting edge of the floor F of the container. To sequentially release first the vertical restraint and then the lateral restraint, shaft 38 is rotated in a clockwise direction from the position shown in FIG. 3. Control of rotation of shaft 38 is by a manually actuable crank 50 whose movement is transmitted via mechanism 52 to shaft 38. Upon movement of crank 50 in a clockwise direction as viewed in FIG. 3, this clockwise movement of the crank is transmitted via mechanism 52 to shaft 38. As shaft 38 begins to move from the position shown (FIG. 3) in a clockwise direction, abutment block 48 swings downwardly away from the lower edge of plate 42, thus releasing its support of this plate. The plate, which is offset to the right of the axis of shaft 38 as viewed in FIG. 3 will normally tend to fall with the downwardly swinging abutment block 48 toward the position shown in FIG. 5, thereby releasing the vertical restraint on container C by the retraction of flange 46 clear of the floor F of the container.

During this initial movement of shaft 38 in a clockwise direction, arm 40 is moved toward, but does not yet contact, the lateral restraint latch member 24. At the time abutment 48 on shaft 38 has been rotated to a position which will accommodate complete retraction of vertical restraint member 42 to a position below surface S, arm 40 moves downwardly into contact with latch member 24, reaching the position shown in FIG. 2. At this particular moment, the vertical restraint is completely released so that the door D of the container can be opened, however, at this time, the lateral restraint members still are positioned with their toe member 32 projecting upwardly into a laterally restraining relationship with the container. As continued movement of the actuating crank 50 drives arm 40 into contact with lateral restraint member 24, an increased resistance is sensed by the operator, because the counterweight 32 exerts a noticeable resistance to continued movement of shaft 38. If the operator does not wish to release the lateral restraint, he discontinues movement of crank 50 upon sensing this increased resistance, and at this time the container is restrained only laterally and the door is clear to be opened or shut. To completely release the container, the operator continues to move crank 50, thus driving arm 40 downwardly against lateral restraint member 24 to pivot the restraint in a counterclockwise direction as viewed in FIG. 2 about its pivot 34 until toe portion 32 of the latch member has been retracted below surface S.

I claim:

1. In a containerized baggage trailer or the like having a platform adapted to support a baggage container, and latch means engageable with a baggage container on said platform for restraining said container against both lateral and vertical movement relative to said platform;

the improvement wherein said latch means comprises a first latch member mounted on said platform for movement between a retracted position below the surface of said platform to an operative position wherein said first latch member is engageable with a side surface of baggage container to prevent lateral movement of the container on the platform, a second latch member mounted on said platform for movement between a retracted position below the surface of said platform and an operative position wherein said second latch member overlies an upwardly facing surface on said container to restrain said container against vertical movement relative to said platform, and latch actuator means mounted on said platform for controlling movement of said first and said second latch members between their respective retracted and operative positions, said latch actuator means being operable to release said second latch member from its operative position while maintaining said first latch member in its operative position.

2. The invention defined in claim 1 wherein said actuating means comprises a horizontal shaft mounted on said platform for rotation about its axis, first abutment means projecting from said shaft and engageable with said first latch member to shaft said first latch member from its operative position to its retracted position when said shaft is rotated in a first direction through a first angular range, and second abutment means projecting from said shaft and engageable with said second latch member to shift said second latch member from its retracted position to its operative position when said shaft is rotated in a direction opposite to said first direction through a second angular range.

3. The invention defined in claim 2 wherein said first latch member includes means mounting said first latch member for pivotal movement on said platform, a counterweight on said first latch member gravitationally biasing said first latch member toward its operative position, and stop means engageable between said first latch member and said frame for locating said first latch member in its operative position.

4. The invention defined in claim 2 wherein said second latch member comprises means mounting said second latch member upon said shaft for free pivotal movement about said shaft, and said second abutment means comprises a member fixed to said shaft and engageable with said second latch member at a location offset from the axis of said shaft to drive said second latch member in rotation with said shaft in said opposite direction.

5. In a containerized baggage trailer or the like having a platform adapted to support a baggage container, and latch means engageable with a baggage container on said platform for restraining said container against movement relative to said platform; the improvement wherein said latch means comprises a first latch member, mounting means mounting said first latch member on said platform for pivotal movement about a horizontal axis between an operative position wherein a toe portion of said latch member projects upwardly above the container supporting surface of said platform and a retracted position wherein said latch member is disposed below said surface of said platform, said latch member when in said operative position being operable to engage a side surface of a container supported on said platform to restrain the container against lateral movement on said platform, stop means on said platform engageable with said latch member to establish said operative position, biasing means biasing said latch member toward said stop means, actuating means for pivoting said latch member to said retracted position against the action of said biasing means; comprising an actuating member movably mounted on said platform, and an abutment portion on said actuating member engageable with said latch member throughout a portion of the range of movement of said actuating member to drive said latch member from its operative position to its retracted position upon movement of said actuating member in one direction through said portion of its range of movement.

6. The invention defined in claim 5 wherein said mounting means comprises a pair of spaced parallel side plates fixedly mounted on said platform below the container supporting surface thereof, said latch member being supported for pivotal movement between said side plates and said toe portion projecting upwardly from between said side plates when said latch member is in said operative position and a stop pin mounted in said toe portion of said latch member and engageable with said side plates to constitute said stop means.

7. The invention defined in claim 5 wherein said actuating member comprises a shaft rotatably mounted on said platform, and an actuating arm fixedly mounted on and projecting radially from said shaft to engage said latch member throughout a predetermined limited range of rotation of said shaft.

8. The invention defined in claim 5 wherein said biasing means comprises a counterweight mounted on said latch member.

9. In a containerized baggage trailer or the like having a platform adapted to support a baggage container, and latch means engageable with a baggage container on said platform for restraining said container against both lateral and vertical movement relative to said platform; the improvement comprising first and second latch members independently mounted upon said platform for movement between respective retracted positions below the surface of said platform and operative positions projecting above the surface of said platform wherein said latch members are engageable wth surfaces of a baggage container to restrain the container against lateral and vertical movement on said platform, an actuator member mounted on said platform for selectively locating said latch members in both their respective retracted and operative positions, said actuator member being movable between an actuated position wherein said actuator member retains both of said latch members in their respective operative positions, an intermediate position wherein said actuator member retains only one of said latch members in its operative position, and a release position wherein said actuator member retains neither of said latch members in their operative position.

* * * * *